May 19, 1970   J. K. FULKS   3,512,235
BROACH ASSEMBLY
Filed Jan. 2, 1968   3 Sheets-Sheet 1
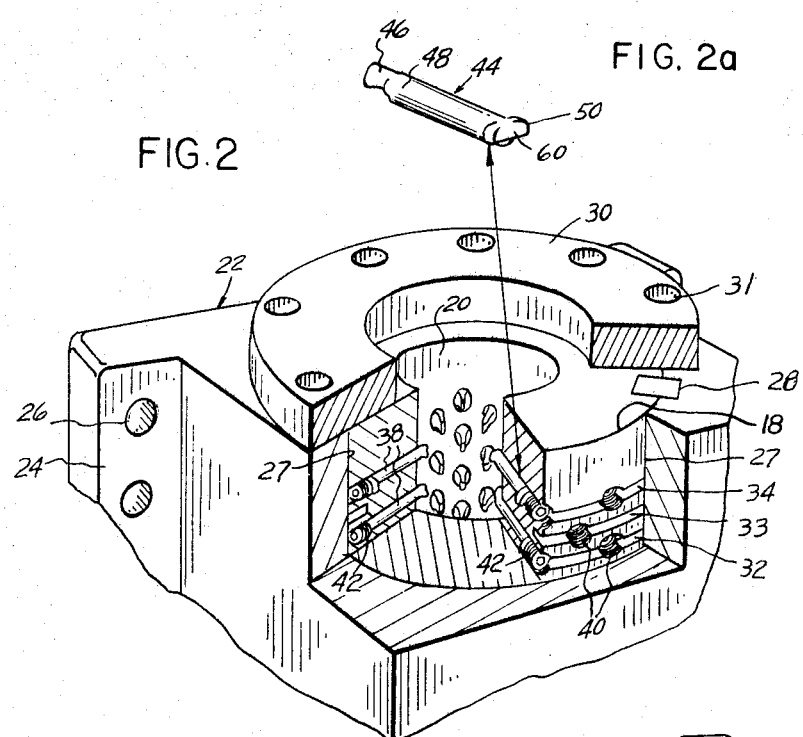
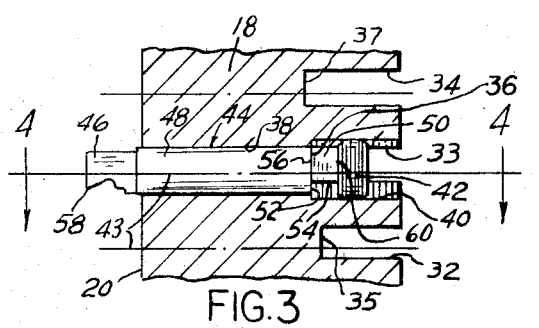
INVENTOR.
JAMES K. FULKS
BY
Hauke, Kuen, Gifford, & Patalidis
ATTORNEYS

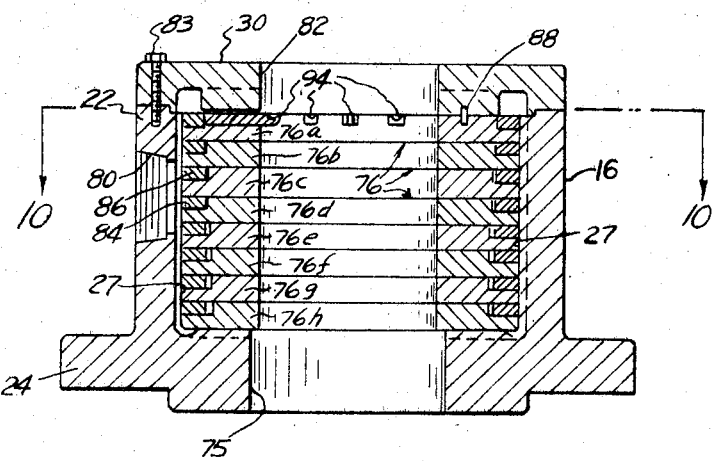
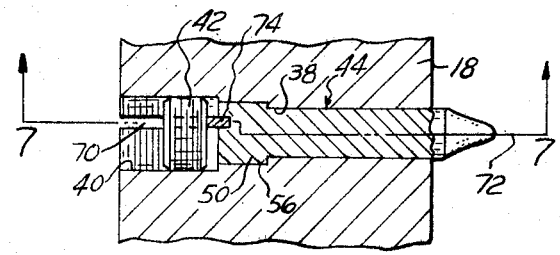
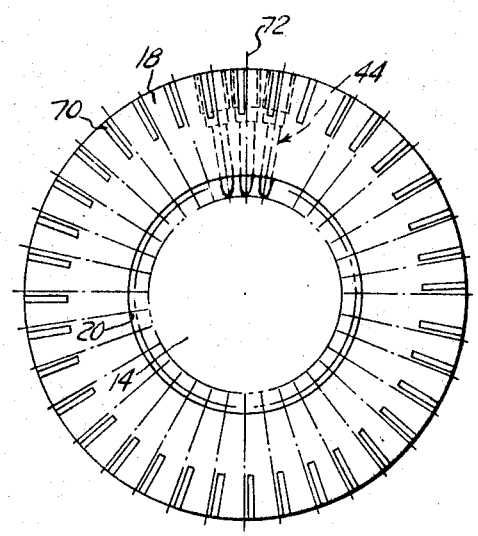
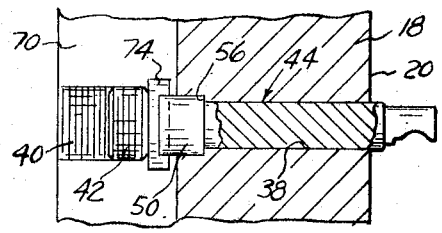

May 19, 1970  J. K. FULKS  3,512,235
BROACH ASSEMBLY
Filed Jan. 2, 1968  3 Sheets-Sheet 3
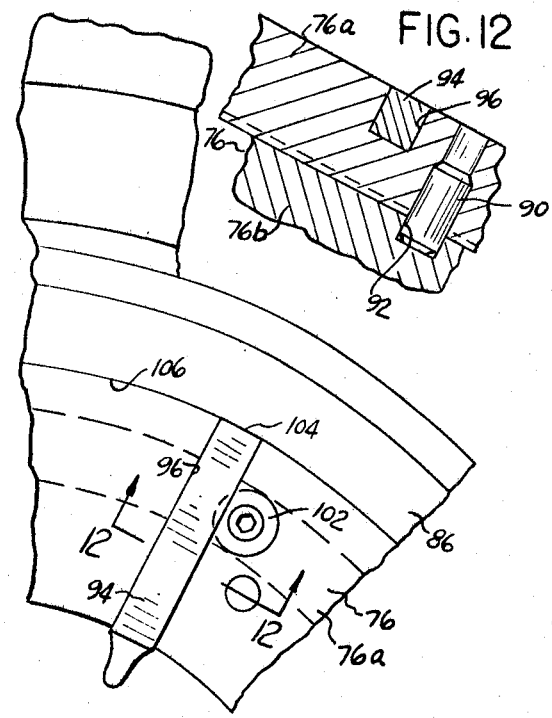
FIG. 12
FIG. 11
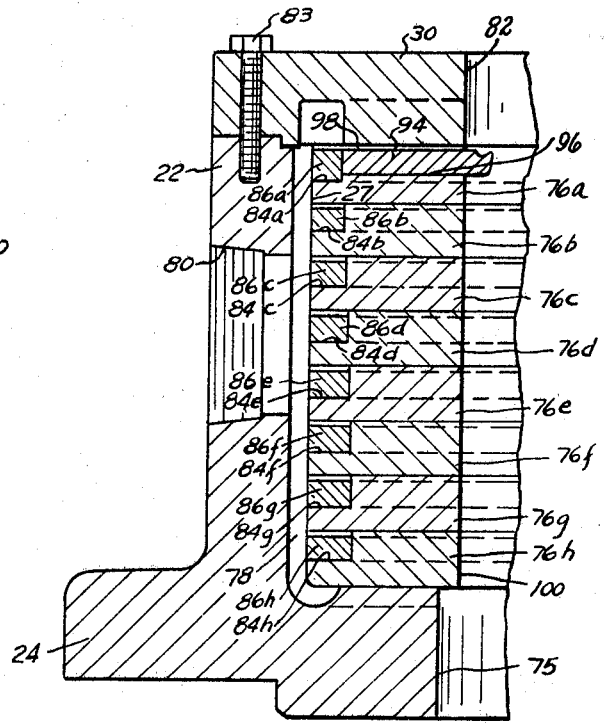
FIG. 9
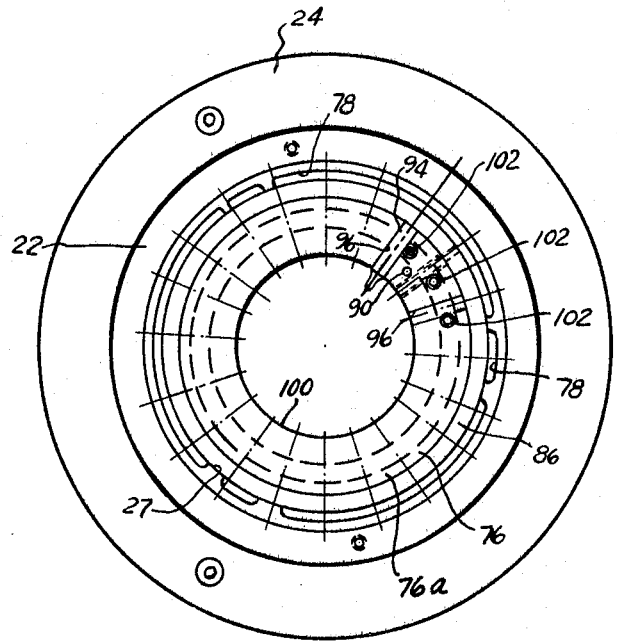
FIG. 10
INVENTOR.
JAMES K. FULKS
BY
ATTORNEYS

United States Patent Office
3,512,235
Patented May 19, 1970

3,512,235
BROACH ASSEMBLY
James K. Fulks, Detroit, Mich., assignor to Colonial Broach & Machine Company, Warren, Mich., a Corporation of Michigan
Filed Jan. 2, 1968, Ser. No. 695,132
Int. Cl. B23p 15/42; B26d 1/04
U.S. Cl. 29—95.1
10 Claims

ABSTRACT OF THE DISCLOSURE

A broaching assembly having a plurality of removable cutting inserts for the external broaching of the outside periphery of a workpiece. The broach holder portion has radially disposed seating means for receiving the inserts so that they properly locate both axially and radially the extent to which the cutting edge progressively projects toward the workpiece. All the inserts for the assembly can be manufactured in a standard size thus reducing the cost and time required for maintenance of the broach assembly.

BACKGROUND OF THE INVENTION

Field of the invention

The present invention relates generally to broaches and more particularly to a broach assembly for external broaching of a workpiece by means of removable cutting inserts.

Description of the prior art

In the prior art, various types of tools have been used for the simultaneous external broaching of the outside periphery of a workpiece. Primarily external broaching of this type is accomplished by employing a stack of annular internally toothed broach rings which are rigidly supported in axial alignment in a cup-shaped holder. Attention is directed to U.S. Letters Patent No. 2,629,294 illustrating a broaching assembly of this type.

One disadvantage of the ring type external broach is that if any one of the cutting teeth contained on each ring is damaged the entire ring usually must be replaced and discarded due to the time and cost involved in sharpening all the teeth of the ring.

Still another disadvantage is that each broach ring must have the internal diameter of its cutting teeth arranged to progressively increase or decrease in size from the next adjacent ring so that no two rings of the broach assembly are interchangeable.

SUMMARY OF THE INVENTION

The present invention contemplates an external broaching assembly having cutting inserts individually replaceable in a holder. The holder is provided with a plurality of radially positioned insert seats which can be arranged, for example, in horizontal tiers or layers whereby locating means of the seats cooperate to progressively position the inserts of each successive tier in their proper broaching arrangement. By means of the present invention, it is possible to have all the cutting inserts for the broaching assembly formed from uniform cutting insert blanks, thus greatly reducing the initial cost of the broach assembly. Also, by being able to replace individual cutting inserts the maintenance cost of applicant's broaching assembly is substantially reduced, while the damaged teeth of the inserts can be resharpened for subsequent reuse or discarded as throw away items.

A further advantage of applicant's broaching tool is derived from the fact that the cutting inserts are designed to be positionable in the broaching holder whereby the cutting edges of the inserts can be oriented only in a single axial position. This fool-proof feature of insuring that all the cutting edges are correctly aligned is of extreme importance in a broaching assemby requiring the placement of an extensive number of cutting inserts in a housing where a single misaligned insert would render the workpiece unusable.

It is therefore an object of the present invention to provide an improved broaching assembly having replaceable cutting inserts which are standardized in size.

It is another object of the present invention to provide a broaching assembly for the external broaching of the outside periphery of a workpiece wherein replaceable cutting inserts cooperate with seating means in the holder such that each insert is axially aligned and radially disposed upon placement in the holder.

It is still a further object of the invention to provide a broaching assembly wherein the cutting inserts can be located in a single correct manner to prevent inadvertent misalignment of the cutting edge of one or more inserts.

Still further objects and advantages of the present invention will readily occur to one skilled in the art to which the invention pertains upon reference to the following description.

BRIEF DESCRIPTION OF THE DRAWINGS

The description refers to the accompanying drawings in which like reference characters refer to like parts throughout the several views and in which:

FIG. 1 is a fragmentary perspective view of a vertical broaching machine using the broaching assembly of the instant invention;

FIG. 2 shows a perspective view partly in section, of an example of embodiment of a broaching assembly constructed in accordance with the present invention;

FIG. 2a is an enlarged perspective view of a cutting insert of FIG. 2;

FIG. 3 is an enlarged vertical partial cross section showing a typical cutting insert positioned in the holder of FIG. 2;

FIG. 4 is a horizontal partial sectional view taken on line 4—4 of FIG. 3;

FIG. 5 is a plan view of a portion of a modification of the broach assembly of FIGS. 1–4;

FIG. 6 is a partial enlarged transverse sectional view of the modification of FIG. 5;

FIG. 7 is a sectional view thereof from line 7—7 of FIG. 6;

FIG. 8 is a longitudinal sectional view of a further modification of the invention;

FIG. 9 is an enlarged view of part of the assembly of FIG. 8;

FIG. 10 is a transverse sectional view taken on the line 10—10 of FIG. 8;

FIG. 11 is an enlarged view of a portion of FIG. 10; and

FIG. 12 is a fragmentary sectional view from line 12—12 of FIG. 11.

DESCRIPTION OF THE PREFERRED EMBODIMENT

The broach assembly of the present invention is intended primarily for the purpose of externally broaching the outside periphery of a workpiece such as, for example, straight spline broaching or helical gear broaching. It will be recognized however that applicant's invention could have application to other forms of broaching and that the following disclosure relates only to preferred embodiments of the invention and that numerous modifications or alterations may be made herein without departing from the spirit and scope of the invention as set forth in the appended claims.

Referring now to the drawings, FIG. 1 partially illustrates a vertical broaching machine 10 of the push type having a single work station. The broaching machine 10 comprises a reciprocating ram 12 having a workpiece 14 mounted thereon for cutting of grooves or splines by pushing the workpiece through a broach assembly, generally indicated at 16. It will be noted that helical grooves or splines can also be cut by relative angular rotation of the workpiece and broach assembly around their common longitudinal axis. While the broach assembly 16 is shown with reference to a vertical push-broaching machine for purposes of description, it is to be understood that the applicant's broaching device could be employed in other types of broaching machines, and the broach assembly may, for example, be mounted on the reciprocating ram of the machine with the workpiece held on the end of a stationary post.

As shown in the perspective view of FIG. 2, the broaching assembly comprises a holder 18 preferably of cylindrical configuration having an axially extending opening in the form of a cylindrical bore 20. The broach holder 18 is shown mounted in a suitable supporting housing 22 having integral flanges 24 provided with securing means such as bolt holes shown at 26 for attachment to the broaching machine. The holder 18 is secured against rotation in a cylindrical recess 27 of the housing 22 by suitable means such as the key and keyway arrangement indicated at 28.

A securing ring indicated at 30 is positioned on the housing 22 so as to extend over the upper surface of holder 18 and is provided with a plurality of mounting holes 31 for receiving machine bolts (not shown) the threaded ends of which engage threaded apertures in the upper face of the housing 22.

A plurality of annular grooves are formed in the outer wall of the broach holder 18. The grooves, only three of which are shown, as represented at 32, 33 and 34, are continuous around the periphery of the holder, and as will be noted in the enlarged cross section of FIG. 3, are each formed having progressively increased radial depths as they proceed upwardly toward the top of the broach holder. That is, the groove 32 has its internal diameter, indicated at 35, greater than the internal diameter 36 of groove 33, which in turn has its internal diameter 36 greater than the internal diameter 37 of groove 34.

Intersected by each of the annular grooves is a plurality of radially aligned apertures or bores 38, providing cutting insert support means, and which extend through the walls of the holder 18. Each of the bores 38 has a counter-bore portion 40 shown threaded for the reception of threaded members such as the set screws represented at 42.

It will be noted in FIG. 3 that the common centerlines 43 of the counter-bores 40 and radial bores 38 are vertically offset relatively to the plane of symmetry of the grooves 32, 33 and 34 for a purpose to be explained hereinafter.

Each of the radial bores 38 is formed to slidably accept an individual cutting insert indicated at 44 and shown enlarged in FIG. 2a. All cutting inserts 44 of the broaching assembly are of a uniform size, each having a cutting bit portion 46, a central cylindrical body portion 48 and a laterally enlarged head portion 50. It will be appreciated from this arrangement that the width of grooves 32, 33 and 34 is less than the diameter of bore 38 but is of a size adapted to slidably receive the cutting insert heads 50 when oriented such that their offset surfaces 54 are positioned in the horizontal plane of each groove. In the example of embodiment shown, the upper side of each groove 32, 33 and 34 is positioned substantially tangent to the radial bores 38 so as to accept each insert head 50 only if the corresponding cutting insert 44 is properly oriented.

In operation each group of tier of cutting inserts 44 intersected by a particular groove, such as groove 33, for example, can be inserted into any of the respective radial bores 38 in a single axial position wherein the cutting bit 46 of each cutting insert is oriented with its cutting edge 58 directed downwardly. The cutting inserts can be placed into their respective radial position in holder 18 with their shoulders 56 seated on the bottom of groove 32, 33 or 34, only when the eccentrically disposed head 50 is oriented to the position shown in FIG. 3. Thus, the cutting edge 58 of each tier of cutting inserts are located on a common circle concentric with the longitudinal bore 20 of the holder 18.

When each set screw 42 is threaded within its appropriate counter-bzore 40, its end is advanced against the end surface 60 of the insert to lock the insert in position so that the cutting edge 58 projects an exact predetermined distance beyond the annular face of the holder longitudinal bore 20. It will be seen from FIG. 2 that the set screws 42 have suitable hexagon-shaped recesses for the reception of special wrenches to allow threading of each set screw into position. In such manner each tier of cutting inserts 44 can be correctly positioned with the insert cutting edges located on successive concentric circles, the diameters of which progressively decrease as they approach the uppermost groove 34. This progressively provides for adequate cutting of the workpiece surface as it progresses through the longitudinal bore 20 of the holder 18 during a cutting operation.

The fact that all the inserts of the broaching assembly are of a uniform size and configuration so as to be interchangeable provides a further advantage of the present invention. Additionally, all the cutting inserts 44 may be renovated by resharpening all the cutting bits 46 exactly the same and replacing the cutting inserts at random in the assembly so that the broaching tool can continue to broach the identical type of workpiece as previously cut before resharpening. By grinding the head shoulder surfaces 56 of the cutting inserts of the same amount as is removed from the cutting edges the shank distance, indicated by the dimension $d$ in FIG. 4, can be maintained constant. As the head portion 50 is reduced in longitudinal thickness after each sharpening operation, screw means 42 is advanced further into the threaded counter-bore 40 to compensate for the reduced overall axial length of the insert.

Referring now to FIGS. 5–7, there is shown a modification of a broach holder 18 for mounting in a broach housing, as hereinbefore described, such modification of the broach holder being provided with a plurality of longitudinal disposed grooves 70, a plurality of cutting inserts 44 being radially disposed in appropriate radial apertures 38 through the wall of the holder 18. Several tiers of cutting inserts may thus be disposed on the holder 18, as previously explained with respect to the embodiment of FIGS. 2–4, for the purpose of broaching the peripheral surface of a workpiece, shown at 14 in FIG. 5, when such workpiece is displaced with respect to the broaching assembly by being forced through the longitudinal bore 20 in the holder 18. As shown in FIGS. 5 and 6, the axis of each longitudinal groove 70 is slightly offset with respect to the axis 72 of the cutting inserts 44, such that each of the grooves 70 act as an orienting and guiding means for an elongated key 74 brazed, welded or otherwise fastened to the rear face of each of the enlarged head portions 50 of each cutting insert 44 such that each cutting insert may be inserted in each aperture 38 only with the cutting edge of the insert accurately oriented for proper cutting of the workpiece. Each cutting insert is held in position by means of a threaded member or set screw 42 adapted to thread in a threaded bore 40 having its axis aligned with the axis 72 common to both each cutting insert 44 and its appropriate radial aperture 38. Each cutting insert 44, is held in position by tightening the set screw 42, in the same manner as hereinbefore explained with respect to the embodiment of FIGS. 2–4.

It is obvious that for some applications wherein the cutters of each tier are disposed directly above the cutters of the preceding tier, or when the tiers are disposed in a spiral, the arrangement of FIGS. 5–7 with longitudinally disposed grooves may be preferable to the arrangement of FIGS. 2–4 with peripherally disposed annular grooves. It is also obvious that the structure of the cutting inserts 44 of FIGS. 5–7, provided with the attached key orienting member 74, is substantially the equivalent of the cutting insert structure described relatively to FIGS. 2–4.

FIGS. 8–12 illustrate a modification of the hereinbefore described assembly which comprises a cup-shaped supporting housing 22 having a supporting flange 24 and an axially extending bore 27 with a reduced diameter portion 75 at the bottom thereof as shown in FIGS. 8–9. A plurality of annular carrier rings, indicated generally by the numeral 76 and shown at 76a–76h, are disposed in the bore 27 of the housing 22. The housing 22 has a plurality of arcuate recesses, indicated at 78, of varying extent and which communicate with the threaded opening shown at 80 to allow the introduction of cooling and lubrication fluids into the interior of the broach housing 22.

A suitable cap ring member 30 is provided to overlie the housing 22 and function as a clamping and holding means for the assembly of annular carrier rings 76. The cap ring member 30 has a central aperture 82 for passage of the workpiece therethrough and is connected to the housing 22 by suitable means such as a plurality of threaded bolts as indicated at 83. Each carrier ring 76 is provided with a peripheral annular notch portion 84 disposed on the upper face thereof for the reception of a back-up ring member 86. Therefore each of the carrier rings 76a to 76h has a similar back-up ring, 86a to 86h, respectively for reception in a corresponding annular notch 84a to 84h.

As best seen in FIG. 8, the uppermost carrier ring 76a is provided with a dowel pin 88 for engagement in a bore in the cap member 30. Similarly, each carrier ring 76 is suitably indexed and locked respectively to the next uppermost carrier ring as by means of a dowel pin 90 engaged in an adequate corresponding aperture 92 in the next ring, FIG. 12, such dowel pin location being staggered from one ring to the other to prevent error in assembly of the broach. In this manner the stacked carrier rings are fixably retained in the housing 22 so that cutting inserts carried by the carrier rings, as will hereinafter be explained, are correctly aligned for a broaching operation.

Each carrier ring 76 is provided with one or more generally parallelepipedonic cutting inserts 94 received in radially disposed grooves 96 formed on the upper surface of each of the carrier rings, although, for the purpose of avoiding unnecessary duplications in the drawings, a few such cutting inserts only are represented. The depth of the grooves 96 is greater than the thickness of the cutting inserts 94 (FIG. 9) to allow for a passageway, shown at 98, for supplying cooling and lubricating fluids to the cutting edges of the cutting inserts from recesses 78, each back-up ring 86 being similarly slightly thinner than the annular notches 84 to prevent obstruction to such fluid flow.

As viewed in FIG. 9, the internal diameter of each of the back-up rings 86a to 86h progressively decreases with associated progressive increase of the radial dimension of the annular notches 84a to 84h from the upper to the lower end of the broach assembly as seen in the drawings. By means of this arrangement, the cutting inserts supported by each carrier ring are indexed to progressively extend a predetermined distance into the axial opening 100 formed by the assembly of rings.

Suitable cutting insert clamping means, indicated at 102, in FIGS. 10–11, are provided for each insert for secure clamping in its appropriate indexed position.

Such clamping means may consist of any conventional commercially available wedge and screw arrangement, for example, for the purpose of holding each cutting insert in position in its appropriate radial groove 96 in each carrier ring 76a to 76h, with the rear end face 104 of the cutting insert engaging the inwardly disposed face 106 of the back-up ring 86.

In the embodiment of FIGS. 8–12, the cutting inserts are resharpened, if so desired, by grinding of the top portion of the cutting edge so as to maintain a total length for each insert which remains constant after several successive sharpenings. However, in view of the low cost of the cutting inserts, it is generally preferable to throw these away when worn and replace them with standardized new cutting inserts. It should be appreciated that such a way of renovating the broach assembly applies as well to the previously described embodiments, in view of the relatively low cost of the inserts as compared to the total cost of the assembly.

It can thus be seen that the present invention provides for broaching tools for broaching the surface of a workpiece by causing the workpiece to be forced through the opening of the broach assembly, such operation being generally called "pot-broaching," by providing a broaching assembly having a plurality of disposable low cost standardized cutting inserts instead of utilizing a solid branch assembly or a broach assembly consisting of a plurality of superimposed rings having integral cutting teeth projecting radially.

Having thus described the invention by way of description of several embodiments thereof to be construed as being only illustratitve of the present invention, and any modification thereof will become apparent to those skilled in the art.

What is claimed as new is:
1. A broach assembly comprising:
a housing,
a holder positioned within said housing and having an axially disposed opening therein for passage of a workpiece, said holder comprising a plurality of annular carrier rings, each of said carrier rings having a plurality of radially disposed insert receiving grooves, each of said receiving grooves being formed to receive a removable cutting insert,
abutment means successively cooperating with selected ones of said cutting inserts for locating the inserts a uniform radial distance into the axially disposed opening,
orienting means cooperating with each of said cutting inserts for orienting each cutting insert in a uniform axial position, and
means affixing each said cutting insert in each of said receiving grooves for determining the extent to which each of the cutting inserts projects radially into the axially disposed opening whereby a workpiece moved through the opening is broached by the cutting edges of the cutting inserts.
2. The broach assembly as defined in claim 1, wherein,
(a) each of said carrier ring has an annular notch formed adjacent the outer periphery thereof, and
(b) a back-up ring is received in each annular notch whereby the back-up ring provides a continuous insert seating surface adapted to radially seat the cutting inserts associated with each carrier ring.
3. The broach assembly as defined in claim 2, wherein,
(a) the annular notch of each consecutive carrier ring has a progressively increased radial dimension, and
(b) each back-up ring has a radial dimension complementary of its associated notch whereby the cutting inserts of each ring are located a uniform radial distance into the axially disposed opening.
4. A broach assembly comprising:
a cylindrical holder having an axial opening for passage therethrough of a workpiece to be broached, said holder comprising a plurality of superimposed annular rings each having at least one radially disposed groove, a plurality of radially disposed elongated cutters mounted in said grooves, each of said cutters having a cutting edge projecting a predetermined distance within said axial opening for taking a cut on said workpiece during passage through said axial opening, means for clamping said cutters in said grooves, abutment means associated with each of said rings for engagement with the rear end of said cutters for defining the radial portion of said cutters, orienting means on said cutters cooperating with orienting means dependent from said rings for defining the proper orientation of the cutting edges of said cutters relatively to the axis thereof, and means maintaining said rings in assembly in a predetermined order.

5. A broach assembly comprising:

a housing, a holder positioned within said housing and having an axially disposed opening therein for passage of a workpiece, said holder having a plurality of radially extending bores, each of said bores receiving a removable cutting insert, said holder having a series of peripheral grooves, each of said grooves intersecting selected ones of said bores at a position offset from a plane passing through the axes of said selected bores, head means formed on each of said cutting inserts dimensioned to be received in an associated groove for allowing said cutting insert to be inserted into said bore in a single axial orientation, and means affixing each said cutting insert in each of said bores for determining the extent to which each of said cutting inserts projects radially into the axially disposed opening whereby a workpiece moved through said opening is broached by the cutting edges of said cutting inserts.

6. The broach assembly as defined in claim 5, wherein said head means includes a laterally enlarged portion formed on each of said cutting inserts at an offset position corresponding to the offset of said grooves, and said head means being received in said grooves.

7. The broach assembly as defined in claim 5, wherein said grooves are substantially longitudinally formed on the outer periphery of said housing, and said head means on each of said cutting inserts have abutment means in said bores for determining the projections of each of said cutting inserts into said axially disposed opening.

8. The broach assembly as defined in claim 5, wherein said grooves are annularly formed at progressively increased depths on the outer periphery of said housing, and said head means on each of said cutting inserts have abutment means cooperating with said annular grooves determining the projection of each of said cutting inserts into said axially disposed opening.

9. The broach assembly as defined in claim 8, wherein each bore has its outer end counterbored for the reception of retaining means adapted to engage the head portion of the insert whereby the insert is securely held in assembly with said holder.

10. The broach assembly as defined in claim 9, wherein said counterbore is threaded and said retaining means is a countersunk screw.

References Cited

UNITED STATES PATENTS

| | | | |
|---|---|---|---|
| 2,392,823 | 1/1946 | La Pointe | 29—95.1 |
| 2,940,159 | 6/1960 | Eklund | 29—95.1 |
| 2,998,634 | 9/1961 | Raehrs et al. | 29—95.1 |
| 3,022,710 | 2/1962 | Kopec | 29—95.1 |
| 3,126,611 | 3/1964 | Wiles | 29—95.1 |

GIL WEIDENFELD, Primary Examiner